US012694739B2

(12) United States Patent
Nishino et al.

(10) Patent No.: US 12,694,739 B2
(45) Date of Patent: Jul. 28, 2026

(54) VEHICLE APPARATUS, METHOD, AND STORAGE MEDIUM FOR HUMAN APPROACH DETECTION WITH USER IMAGE AUTHENTICATION

(71) Applicant: HONDA MOTOR CO., LTD., Tokyo (JP)

(72) Inventors: Mitsunori Nishino, Tokyo (JP); Ryo Morosawa, Tokyo (JP); Seonghun Lee, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 161 days.

(21) Appl. No.: 18/443,974

(22) Filed: Feb. 16, 2024

(65) Prior Publication Data

US 2024/0296705 A1 Sep. 5, 2024

(30) Foreign Application Priority Data

Mar. 3, 2023 (JP) ................................. 2023-032490

(51) Int. Cl.
G07C 9/37 (2020.01)
G06V 20/58 (2022.01)
G06V 40/10 (2022.01)

(52) U.S. Cl.
CPC ............... G07C 9/37 (2020.01); G06V 20/58 (2022.01); G06V 40/103 (2022.01)

(58) Field of Classification Search
CPC ......... G07C 9/37; G06V 20/58; G06V 40/103
See application file for complete search history.

(56) References Cited

U.S. PATENT DOCUMENTS

| | | | | | |
|---|---|---|---|---|---|
| 11,447,101 | B2 * | 9/2022 | Moeller | .................. | G06F 18/22 |
| 12,115,931 | B2 * | 10/2024 | Jackson | .............. | G05D 1/0022 |
| 2016/0297400 | A1 * | 10/2016 | Krishnan | .............. | B60R 25/102 |
| 2018/0056937 | A1 * | 3/2018 | Pflug | ....................... | B60R 25/24 |
| 2021/0009080 | A1 * | 1/2021 | Hu | ........................ | G06V 10/82 |
| 2021/0250554 | A1 * | 8/2021 | Liu | ........................ | H04N 7/181 |

(Continued)

FOREIGN PATENT DOCUMENTS

| | | | | | |
|---|---|---|---|---|---|
| CN | 107600007 | A | * | 1/2018 | ........... H04L 67/306 |
| JP | 2015-185064 | A | | 10/2015 | |

(Continued)

OTHER PUBLICATIONS

Machine translation of CN-107600007-A (Year: 2018).*

(Continued)

*Primary Examiner* — Kenneth M Dunne

(74) *Attorney, Agent, or Firm* — Rankin, Hill & Clark LLP

(57) ABSTRACT

A vehicle control apparatus includes: an approach detection section configured to detect a person around a vehicle by a sensing apparatus mounted on the vehicle; an authentication section configured to authenticate, when the approach detection section detects a person, the person detected by the approach detection section as a user of the vehicle by using an image captured by an image capturing unit mounted on the vehicle; and a function control section configured to stop a function for the sensing apparatus when time for which a state in which authentication is not established continues after the authentication section starts the authentication reaches first threshold time or more.

11 Claims, 5 Drawing Sheets

(56)  References Cited

U.S. PATENT DOCUMENTS

| | | | | |
|---|---|---|---|---|
| 2021/0362683 A1* | 11/2021 | Moeller | ............. | B60R 25/1009 |
| 2022/0017044 A1* | 1/2022 | Bielby | ................... | B60R 25/25 |
| 2022/0402459 A1* | 12/2022 | Liu | ........................ | G06V 40/16 |
| 2023/0019720 A1* | 1/2023 | Jin | ..................... | G07C 9/00563 |
| 2023/0073436 A1* | 3/2023 | Kent | .................... | B60R 25/245 |
| 2024/0201688 A1* | 6/2024 | Ko | ......................... | B60L 58/12 |
| 2024/0217482 A1* | 7/2024 | Sachdeva | ........... | G07C 9/00309 |
| 2024/0220023 A1* | 7/2024 | Mali | ...................... | B60R 25/01 |

FOREIGN PATENT DOCUMENTS

| | | | | | |
|---|---|---|---|---|---|
| WO | WO-2014088061 A1 * | 6/2014 | | ........... | B60R 25/245 |
| WO | WO-2022150704 A1 * | 7/2022 | | ......... | G07C 9/00563 |

OTHER PUBLICATIONS

Machine translation of WO-2014088061-A1 (Year: 2014).*

Tesla, "Tesla | Model X Owner's Manual", Jan. 22, Tesla, Dashcam and Sentry Mode. Jan. 2022 version retrieved Via internet archive wayback machine (Year: 2022).*

* cited by examiner

VEHICLE APPARATUS, METHOD, AND STORAGE MEDIUM FOR HUMAN APPROACH DETECTION WITH USER IMAGE AUTHENTICATION

INCORPORATION BY REFERENCE

The present application claims priority under 35 U.S.C. § 119 to Japanese Patent Application No. 2023-032490 filed on Mar. 3, 2023. The content of the application is incorporated herein by reference in its entirety.

BACKGROUND OF THE INVENTION

Field of the Invention

The present invention relates to a vehicle control apparatus, a vehicle control method, and a storage medium.

Description of the Related Art

In recent years, research and development for increasing the efficiency of energy have been conducted to secure more people reasonable, reliable, sustainable, and advanced energy access. For example, Japanese Patent Laid-Open No. 2015-185064 discloses technology that saves electric power by stopping a dashboard camera when no moving object is detected in a system in which the dashboard camera is connected to a sensor unit that detects a moving object.

As described in Japanese Patent Laid-Open No. 2015-185064, a configuration for detecting a moving object is also used for, for example, so-called smart entry that recognizes a user of a vehicle and facilitates the user to get in the vehicle.

Incidentally, stopping a function of an apparatus to save electric power is effective for saving electric power, but stopping the function with high frequency may lead to decreased convenience. It is thus desired to perform processing of stopping a function at an appropriate timing to save electric power.

To solve the problem described above, an object of the present application is to perform an operation of reducing the electric power consumption of a smart entry function of a vehicle at an appropriate timing. This eventually contributes to an increase in the efficiency of energy.

SUMMARY OF THE INVENTION

An aspect for achieving the object described above is a vehicle control apparatus including: an approach detection section configured to detect a person around a vehicle by a sensing apparatus mounted on the vehicle; an authentication section configured to authenticate, when the approach detection section detects a person, the person detected by the approach detection section as a user of the vehicle by using an image captured by an image capturing unit mounted on the vehicle; and a function control section configured to stop a function for the sensing apparatus when time for which a state in which authentication is not established continues after the authentication section starts the authentication reaches first threshold time or more.

Advantageous Effects of Invention

The vehicle control apparatus described above stops a function for a sensing apparatus when a state in which authentication is not established as to a person sensed around a vehicle continues. This suppresses electric power to be consumed due to the detection of a person who does not correspond to a user of the vehicle. It is thus possible to perform an operation of reducing the electric power consumption of a smart entry function of the vehicle at an appropriate timing and eventually contribute to an increase in the efficiency of energy.

DETAILED DESCRIPTION OF THE PREFERRED EMBODIMENTS

1. Configurations of Vehicle and Sensing Range

Figure 1:
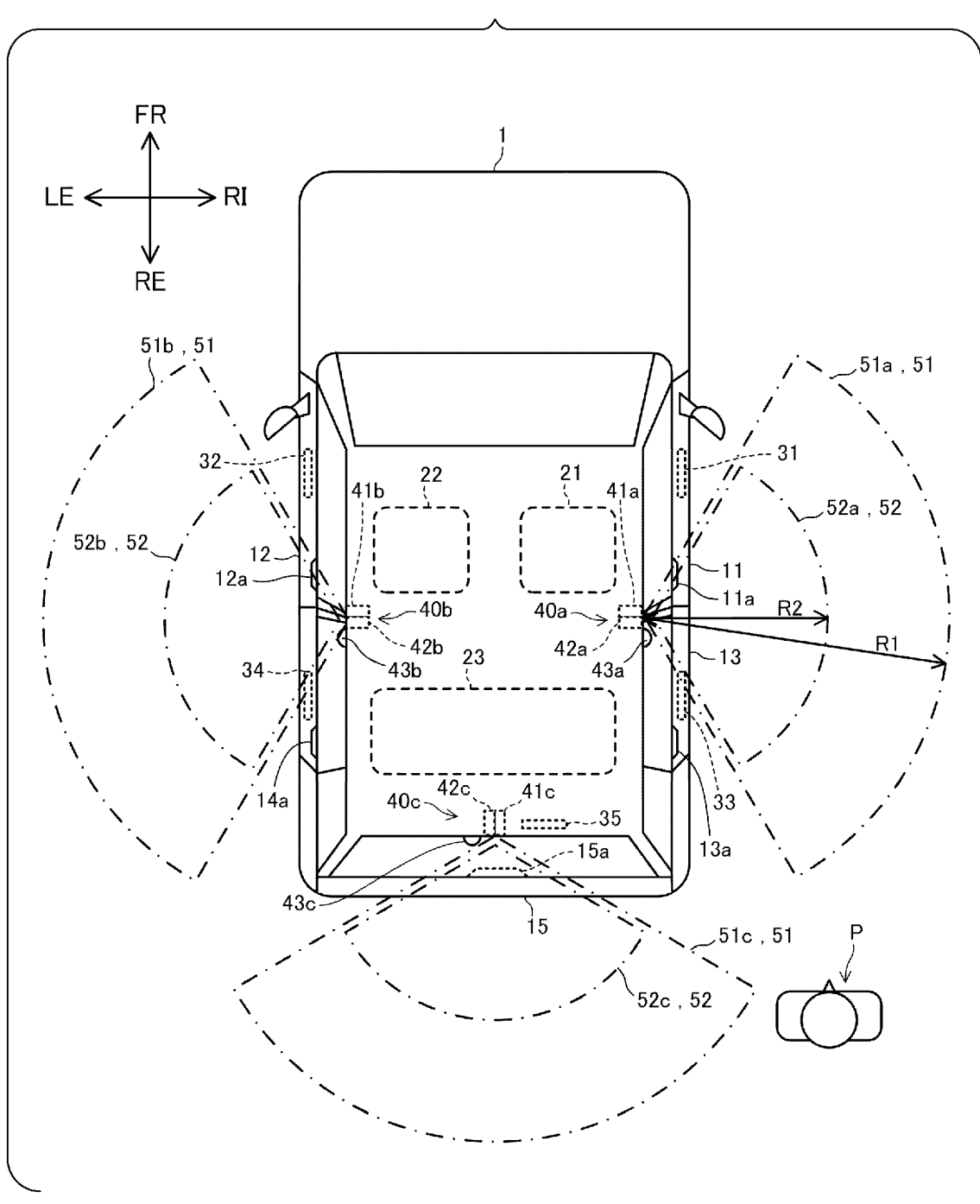
FIG. 1 is a plan view illustrating a configuration of a vehicle and a sensing range.
Figure 2:
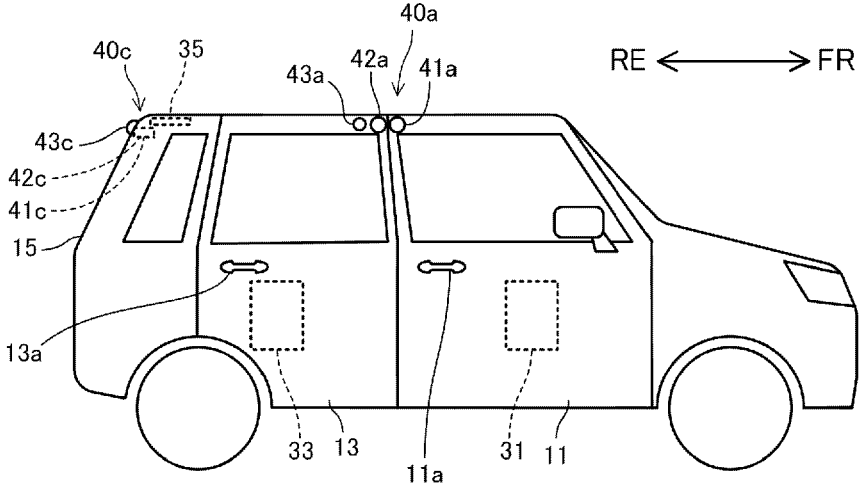
FIG. 2 is a side view illustrating the configuration of the vehicle.

A configuration of each of units of a vehicle 1 mounted with a vehicle control apparatus 100 according to the present embodiment will be described with reference to FIGS. 1 and 2. FIG. 1 is a plan view illustrating a configuration of the vehicle 1 and a sensing range 51. FIG. 2 is a side view illustrating the configuration of the vehicle 1.

In the present embodiment, a description will be given by using, as an example, a case where the vehicle 1 mounted with the vehicle control apparatus 100 is a four-wheeled automobile including a plurality of openable and closeable objects as illustrated in each of FIGS. 1 and 2. Specifically, the vehicle 1 is a hatchback automobile including a front door 11, a front door 12, a rear door 13, a rear door 14, and a rear gate 15 as openable and closeable objects. This is an example and it is sufficient if the vehicle 1 is a mobile object that includes an openable and closeable object and allows a user to climb up and down by opening the openable and closeable object. The vehicle 1 may include any number of openable and closeable objects and the size and application of the vehicle 1, the type of a driving source, the specifications of a wheel, and the like are not limited. In addition, the openable and closeable object is an openable and closeable member that is provided on an outer surface of the vehicle 1 and particularly refers to a member that is opened and closed for the purpose of allowing a person P to climb up into the vehicle 1 and climb down from the vehicle 1 and the purpose of allowing the person P to load luggage into the vehicle 1 and unload luggage from the vehicle 1.

Although described in detail below, the vehicle control apparatus 100 is an apparatus or a device that includes a processor, a memory, an interface circuit, and the like and controls the actuation of the vehicle 1. The vehicle control apparatus 100 is, for example, an electronic control unit (ECU).

In each of FIGS. 1 and 2, the respective directions of the front, rear, right, and left of the vehicle 1 are denoted by reference signs FR, RE, RI, and LE. The front direction FR is the traveling direction of the traveling vehicle 1 and the rear direction RE is the direction of the vehicle 1 that is backing up. The vehicle 1 includes a driver's seat 21, a passenger seat 22, and a back seat 23 as seats on which occupants (users) sit down. In the present embodiment, the driver's seat 21 on which a user who is a driver sits down is disposed on the right side of the vehicle 1 and the passenger seat 22 is disposed on the left side of the vehicle 1, but this is an example. The driver's seat 21 and the passenger seat 22 may be each disposed on the opposite side in accordance with the specifications of the vehicle 1.

The front door 11 is provided in the front of the vehicle 1 on the right side surface and the rear door 13 is provided in the rear direction of the front door 11. The front door 12 is provided in the front of the vehicle 1 on the left side surface and the rear door 14 is provided in the rear direction of the front door 12. The front doors 11 and 12 are respectively provided with door handles 11*a* and 12*a*. The rear doors 13 and 14 are respectively provided with door handles 13*a* and 14*a* and a door handle 15*a* is attached to the rear gate 15. Each of the door handles 11*a*, 12*a*, 13*a*, 14*a*, and 15*a* is a handle that a user grasps to open the door.

The front door 11 is opened and closed when a user who takes the driver's seat 21 climbs up and down and the front door 12 is opened and closed when a user who takes the passenger seat 22 climbs up and down. The rear door 13 and the rear door 14 are each opened and closed, for example, when a user who takes the back seat 23 climbs up and down and when a user who takes the driver's seat 21 or the passenger seat 22 puts luggage on the back seat 23. The rear gate 15 is a door provided at the rear end of the vehicle 1 and is opened and closed for allowing a user to put luggage in the luggage space in the rear of the vehicle body of the vehicle 1.

Figure 3:
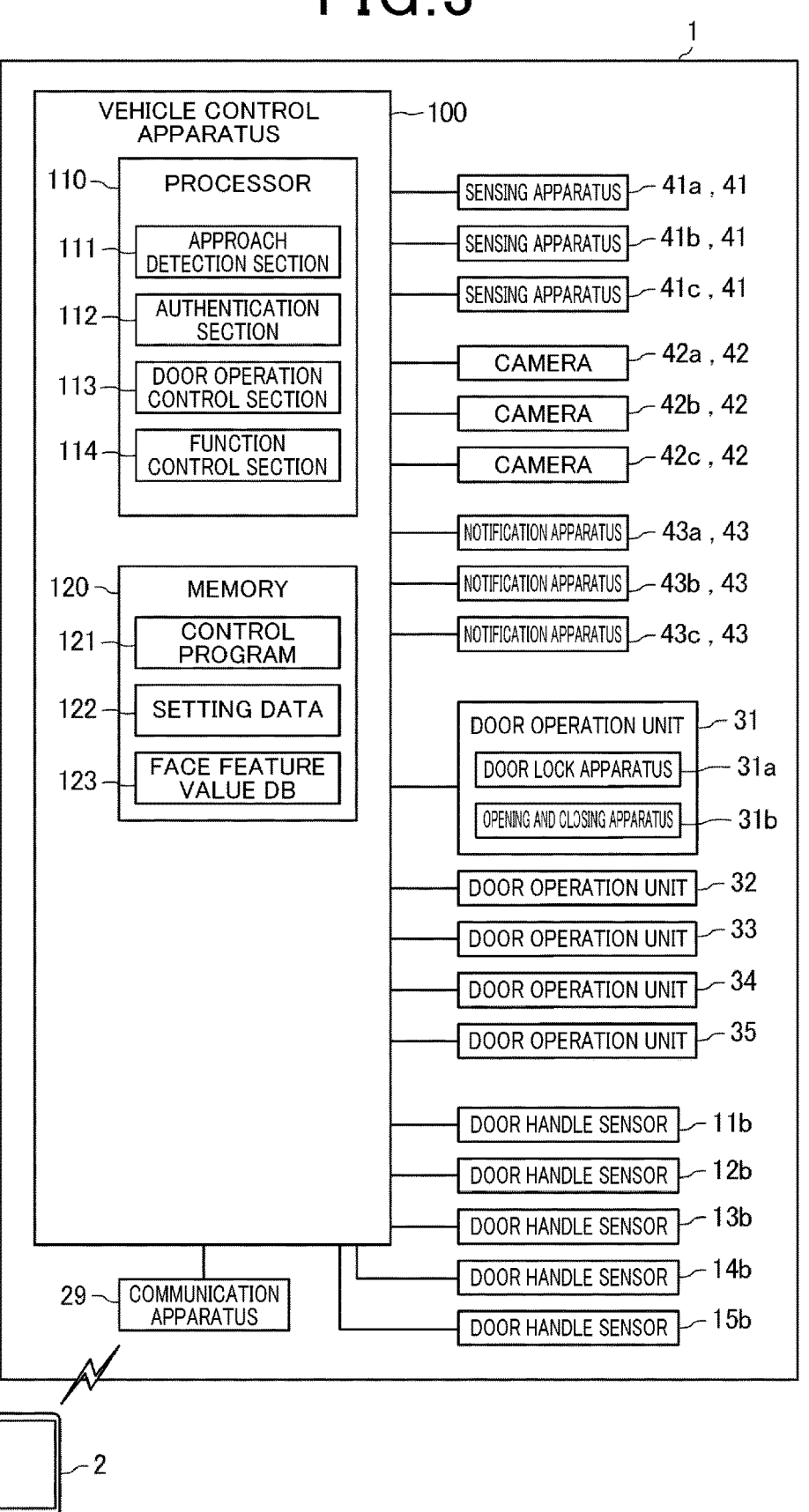
FIG. 3 is a block diagram of a control system of the vehicle.

The front door 11 incorporates a door operation unit 31. The door operation unit 31 includes a door lock apparatus that releases and sets the door lock of the front door 11 as described below. In addition, the door operation unit 31 may include an apparatus that opens the front door 11 with the motive power of a motor or an actuator and the door operation unit 31 may further include an apparatus that closes the front door 11 with motive power. In the present embodiment, a configuration is exemplified in which the door operation unit 31 includes a door lock apparatus 31*a* and an opening and closing apparatus 31*b* as illustrated in FIG. 3. The door lock apparatus 31*a* is an apparatus that locks the front door 11 to prevent the door from opening, and sets and releases the lock in accordance with the control of the vehicle control apparatus 100. The opening and closing apparatus 31*b* includes an unillustrated motor or actuator and performs an opening operation of opening the front door 11 and a closing operation of closing the front door 11.

The front door 12 incorporates a door operation unit 32, the rear door 13 incorporates a door operation unit 33, and the rear door 14 incorporates a door operation unit 34. The rear gate 15 incorporates a door operation unit 35. The door operation units 32, 33, 34, and 35 each include an apparatus that sets and releases the door lock as with the door operation unit 31. The door operation unit 32 also includes an apparatus that performs an opening operation and a closing operation on the front door 12 as with the door operation unit 31. The same applies to the door operation units 33, 34, and 35.

The vehicle 1 has a so-called smart entry function of performing authentication as to whether or not the person P is a user registered in advance when the person P approaches the vehicle 1 and, for example, releasing the door lock of the front door 12 of the vehicle 1 when the authentication is established.

As the smart entry function, the vehicle 1 detects the person P who approaches the vehicle 1 from the right direction, the left direction, or the rear direction of the vehicle 1 and performs authentication as to a user of the vehicle 1 registered in advance. The authentication as to a user refers to the authentication of the detected person P as a registered user of the vehicle 1. As components that detect and authenticate the person P, the vehicle 1 includes detection units 40*a*, 40*b*, and 40*c*.

The detection unit 40*a* is disposed on the right side surface of the vehicle 1. In the configuration of each of FIGS. 1 and 2, the detection unit 40*a* is buried and installed in the outer surface of the center pillar of the vehicle 1 between the front door 11 and the rear door 13. The detection unit 40*b* is disposed on the left side surface of the vehicle 1. The detection unit 40*b* is positioned between the front door 12 and the rear door 14, and buried and installed, for example, in the outer surface of the center pillar of the vehicle 1. The detection unit 40*c* is disposed on the rear surface of the vehicle 1. For example, the detection unit 40*c* is buried and installed in the upper portion of the rear gate 15.

As illustrated in FIG. 2, the detection unit 40*a* includes a sensing apparatus 41*a*, a camera 42*a*, and a notification apparatus 43*a*. The sensing apparatus 41*a* senses the presence of the person P within a sensing range 51*a* in the right direction of the vehicle 1. As a specific configuration of the sensing apparatus 41*a*, a passive infrared ray (PIR) sensor, a camera, a radar, or another apparatus is usable. As the radar, a millimeter wave radar that uses, for example, a frequency band of 30 GHz to 300 GHz is usable. A range within which the sensing apparatus 41*a* is capable of sensing the person P is set, for example, to allow the sensing apparatus 41*a* to sense the person P within a range of about 90° to 180° in the horizontal direction and about 90° to 150° in the vertical direction within a distance R1 from the sensing apparatus 41*a*. In this case, the range within which the sensing apparatus 41*a* is capable of sensing the person P is the fan-shaped sensing range 51*a* illustrated in FIG. 1.

The camera 42*a* is a color or monochrome digital camera. The vehicle control apparatus 100 authenticates the person P as a registered user by checking an image captured by the camera 42*a* against a face image of a person registered as a user of the vehicle 1 in advance. The position of the person P at which the vehicle control apparatus 100 is capable of authentication is described as an authentication range 52*a*. The fan-shaped authentication range 52*a* illustrated in FIG. 1 is, for example, a range of about 90° to 150° in the horizontal direction and about 90° to 150° in the vertical direction within a distance R2 from the camera 42*a*. A radius R1 of the sensing range 51*a* is longer than a radius R2 of the authentication range 52*a*. That is, when the person P approaches the vehicle 1, the person P first enters the sensing range 51*a* to be sensed by the sensing apparatus 41*a*. When the person P enters the authentication range 52*a* after that, the vehicle control apparatus 100 uses the camera 42*a* to authenticate the person P.

The notification apparatus 43*a* issues a notification of the operation state of the detection unit 40*a*. The notification apparatus 43*a* is an indicator including, for example, a light emitting diode (LED), an organic EL illumination element, or another illuminant. The notification apparatus 43*a* is on or is blinking, for example, while the camera 42*a* is shooting an image in accordance with the control of the vehicle control apparatus 100. This makes it possible to inform the person P outside the vehicle 1 of the operation state of the detection unit 40*a*.

The detection unit 40*b* includes a sensing apparatus 41*b* and a camera 42*b* as with the detection unit 40*a*. In addition, the detection unit 40c includes a sensing apparatus 41c and a camera 42c. For example, the sensing apparatuses 41b and 41c each have a configuration common to that of the sensing apparatus 41a. In this case, a sensing range 51b that is a range within which the sensing apparatus 41b senses the person P and a sensing range 51c that is a range within which the sensing apparatus 41c senses the person P are the same as the sensing range 51a in shape and size. In addition, for example, the cameras 42b and 42c each have a configuration common to that of the camera 42a. In this case, an authentication range 52b that is a range within which it is possible to authenticate the person P by using the camera 42b and an authentication range 52c that is a range within which it is possible to authenticate the person P by using the camera 42c are the same as the authentication range 52a in shape and size.

In this case, it is possible for the vehicle 1 to sense the person P within the sensing ranges 51a and 51b in the lateral direction of the vehicle 1 and the sensing range 51c in the rear direction of the vehicle 1. It is then possible for the vehicle 1 to authenticate the person P when the person P is within any of the authentication ranges 52a, 52b, and 52c in the lateral direction of the vehicle 1 and the rear direction of the vehicle 1.

In the following description, when the sensing ranges 51a, 51b, and 51c are not distinguished, the sensing ranges 51a, 51b, and 51c will be each described as a sensing range 51. Similarly, when the authentication ranges 52a, 52b, and 52c are not distinguished, the authentication ranges 52a, 52b, and 52c will be each described as an authentication range 52.

2. Configuration of Vehicle Control Apparatus

FIG. 3 is a block diagram of a control system of the vehicle 1. The control system of the vehicle 1 has a configuration in which each unit of the vehicle 1 is connected to the vehicle control apparatus 100.

The vehicle control apparatus 100 includes a processor 110 and a memory 120. The processor 110 is a computer including, for example, a central processing unit (CPU), a micro controller unit (MCU), and a micro processor unit (MPU). The memory 120 is a rewritable non-volatile storage apparatus and stores a program that is executed by the processor 110 and data that is processed by the processor 110. The memory 120 includes, for example, a semiconductor storage device such as a flash read only memory (ROM) or a solid state disk (SSD), or a magnetic storage device. The memory 120 may include a random access memory (RAM) that forms a work area for temporarily storing a program and data. The vehicle control apparatus 100 may include an integrated circuit (IC) that integrally includes the processor 110 and the memory 120.

The memory 120 stores a control program 121 to allow the processor 110 to read the control program 121. The control program 121 is executed by the processor 110. As the data that is processed by the processor 110, the memory 120 stores setting data 122. In addition, the storage region of the memory 120 is provided with a face feature value data base (DB) 123.

The sensing apparatuses 41a, 41b, and 41c are connected to the vehicle control apparatus 100. In addition, the cameras 42a, 42b, and 42c and the notification apparatuses 43a, 43b, and 43c are each connected to the vehicle control apparatus 100. In the following description, when the sensing apparatuses 41a, 41b, and 41c are not distinguished, the sensing apparatuses 41a, 41b, and 41c will be each described as a sensing apparatus 41. Similarly, when it is unnecessary to distinguish the individual apparatuses, the cameras 42a, 42b, and 42c will be each described as a camera 42 and the notification apparatuses 43a, 43b, and 43c will be each described as a notification apparatus 43.

The sensing apparatus 41 senses the person P within the sensing range 51 in accordance with the control of the vehicle control apparatus 100 and outputs a result of the sensing to the vehicle control apparatus 100. The camera 42 shoots an image in accordance with the control of the vehicle control apparatus 100 and outputs the captured image to the vehicle control apparatus 100. The notification apparatus 43 is turned on or blinks in accordance with the control of the vehicle control apparatus 100.

The door operation units 31, 32, 33, 34, and 35 are each connected to the vehicle control apparatus 100. As described above, in the present embodiment, the door operation unit 31 includes the door lock apparatus 31a and the opening and closing apparatus 31b. The door lock apparatus 31a included in the door operation unit 31 sets and releases the door lock of the front door 11 in accordance with the control of the vehicle control apparatus 100. The opening and closing apparatus 31b performs an opening operation and a closing operation on the front door 11 in accordance with the control of the vehicle control apparatus 100. The door operation units 32, 33, 34, and 35 set and release the door locks of the respective openable and closeable objects, and perform opening operations and closing operations in accordance with the control of the vehicle control apparatus 100 as with the door operation unit 31.

A door handle sensor 11b is connected to the vehicle control apparatus 100. The door handle sensor 11b is a sensor that is provided to the door handle 11a and senses an operation on the door handle 11a. The door handle sensor 11b includes, for example, a capacitance sensor that senses a contacting operation, a push button switch that is turned on by a pushing operation, or another sensor or switch. The door handle sensors 12b, 13b, 14b, and 15b are sensors that are provided to the respective door handles 12a, 13a, 14a, and 15a and sense operations on the door handles 12a, 13a, 14a, and 15a. The door handle sensors 12b, 13b, 14b, and 15b are each configured, for example, as with the door handle sensor 11b.

When the door handle sensor 11b senses an operation on the door handle 11a, the door handle sensor 11b outputs a sensing signal to the vehicle control apparatus 100. Similarly, when the door handle sensors 12b, 13b, 14b, and 15b respectively sense operations on the door handles 12a, 13a, 14a, and 15a, the door handle sensors 12b, 13b, 14b, and 15b output sensing signals to the vehicle control apparatus 100. An operation on any of the door handles 12a, 13a, 14a, and 15a by a user is an example of an operation on the openable and closeable object.

A communication apparatus 29 is connected to the vehicle control apparatus 100. The communication apparatus 29 is an apparatus that communicates with an apparatus outside the vehicle 1 in accordance with the control of the vehicle control apparatus 100. The communication apparatus 29 is a wireless communication apparatus that includes, for example, an antenna which transmits and receives wireless signals, a baseband circuit, an RF circuit, and the like and executes functions of a transmitter and a receiver.

The communication apparatus 29 executes near-field communication. The communication apparatus 29 executes near-field communication that is, for example, compliant with any of Bluetooth®, Ultra Wide Band (UWB), and another communication scheme. The communication apparatus 29 may be configured to be capable of executing wireless data communication in accordance with a cellular communication scheme such as long term evolution (LTE) or the fifth-generation mobile communication scheme (5G).

The communication apparatus 29 executes near-field communication with a terminal apparatus 2 positioned near the vehicle 1. In addition, the communication apparatus 29 may execute cellular communication and may execute data communication with the terminal apparatus 2 through an unillustrated base station or server.

The terminal apparatus 2 is an apparatus that is used by a person registered as a user of the vehicle 1, and transmits a signal to the communication apparatus 29 by using a near-field communication function. The terminal apparatus 2 is, for example, a smartphone, a tablet computer, or a notebook computer. The terminal apparatus 2 may also be an FOB key.

The sensing apparatus 41, the camera 42, the notification apparatus 43, the door operation units 31, 32, 33, 34, and 35, and the door handle sensors 11b, 12b, 13b, 14b, and 15b each operate by electric power supplied from an unillustrated battery of the vehicle 1. The vehicle control apparatus 100 is capable of performing control to start the supply of electric power to each of the units including the sensing apparatus 41 and the camera 42 and performing control to stop the supply of electric power. For example, the vehicle control apparatus 100 is connected to an unillustrated electric power supply circuit that supplies electric power to each of the units including the sensing apparatus 41 and the camera 42 and configured to perform controls to start and stop the supply of electric power by switching a switch incorporated in the electric power supply circuit.

The processor 110 includes an approach detection section 111, an authentication section 112, a door operation control section 113, and a function control section 116. These components are implemented by the processor 110 executing the control program 121.

The approach detection section 111 detects the person P who approaches the vehicle 1 on the basis of a result of sensing by the sensing apparatus 41. The approach detection section 111 identifies the sensing range 51 within which the person P is sensed among the sensing ranges 51a, 51b, and 51c by identifying the sensing apparatus 41 that senses the person P.

The authentication section 112 executes authentication as to whether or not the person P is a person registered as a user of the vehicle 1 on the basis of an image captured by the camera 42. Determining by the authentication section 112 that the person P is a registered user of the vehicle 1 is referred to as authentication establishment. Authentication failure and authentication non-establishment mean that the authentication section 112 does not determine that the person P is a user of the vehicle 1.

Before performing authentication, the authentication section 112 executes processing of obtaining the movement direction of the person P on the basis of an image captured by the camera 42. When the camera 42 captures still images, the authentication section 112 obtains a plurality of images consecutively captured by the camera 42 one by one and extracts an image of the face or the body of the person P from each captured image. The authentication section 112 obtains the trajectory of a change of the position of the person P over time by comparing the positions of the images of the person P in the plurality of captured images.

In addition, when the camera 42 captures a moving image, the authentication section 112 obtains a plurality of frames included in the image captured by the camera 42 and extracts an image of the face or the body of the person P from each frame. The authentication section 112 obtains the trajectory of a change of the position of the person P over time by comparing the positions of the images of the person P in the plurality of frames. The authentication section 112 estimates the traveling direction of the person P by extending the obtained trajectory. After the authentication section 112 estimates the traveling direction of the person P, the authentication section 112 determines whether or not the vehicle 1 is reached in the estimated traveling direction. This determination can be regarded as a determination as to whether or not the traveling direction of the person P is a direction toward the vehicle 1.

The authentication section 112 repeatedly executes the processing of estimating the traveling direction of the person P and the determination as to whether or not the traveling direction of the person P is a direction toward the vehicle 1. The authentication section 112 then performs authentication when it is determined a determination criterion number of times or more in a row that the traveling direction of the person P is a direction toward the vehicle 1. That is, determining a determination criterion number of times in a row that the traveling direction of the person P is a direction toward the vehicle 1 is a condition for the authentication section 112 to perform authentication. The value of the determination criterion number of times is not limited, but any value is set in accordance with the level of determination precision or the like requested of the vehicle control apparatus 100. Information indicating the determination criterion number of times is included in the setting data 122 and stored in the memory 120. This makes it possible to decrease events in which the person P who is not moving toward the vehicle 1 is authenticated, and increase the efficiency of processing of the vehicle control apparatus 100 and suppress the amount of electric power to be consumed for the vehicle control apparatus 100.

As a specific technique for the authentication section 112 to perform authentication, a variety of publicly known methods are usable. In the present embodiment, an example is demonstrated in which the vehicle control apparatus 100 includes the face feature value DB 123 in the memory 120 and the authentication section 112 performs authentication by using the face feature value DB 123. The face feature value DB 123 is a data base in which a feature value of an image of the face of a person registered as a user of the vehicle 1 is accumulated. The user of the vehicle 1 includes a person who drives the vehicle 1. A person who does not drive the vehicle 1, but gets in the vehicle 1 may be registered as the user.

The authentication section 112 may be configured to be capable of executing processing of registering a user of the vehicle 1. In this case, the authentication section 112 obtains a still image of the face of the user from an image captured by the camera 42 or another camera. The authentication section 112 extracts a region having a general feature value of a face from the obtained still image as the face region. The general feature value of a face is, for example, the shape of the outline of the face, the positions of the eyes and the nose relative to the outline, and another feature. The face region refers to a face image portion of the still image. The authentication section 112 sets a feature point in the face region. For example, the authentication section 112 searches the face region and the authentication section 112 sets a feature point on an eye, an eyebrow, the nose, the outline, or the like. A position at which a feature point is set and the number of feature points are set in advance by the authentication section 112 or decided by algorithm included in the control program 121. The authentication section 112 detects the feature value of a feature point and stores the detected feature value in the face feature value DB 123 in association with the user.

When the authentication section 112 performs authentication, the authentication section 112 obtains an image captured by the camera 42. For example, when the camera 42 shoots a still image, the authentication section 112 obtains the one image captured by the camera 42. In addition, for example, when the camera 42 shoots a moving image, the authentication section 112 obtains the image captured by the camera 42 for each of the frames and uses the image of the one obtained frame as one captured image. This one captured image is a still image.

The authentication section 112 extracts a face region that is an image of a human face from the one obtained captured image. The authentication section 112 sets feature points on the extracted face region as described above and detects the feature value of each of the feature points. The authentication section 112 compares a feature value detected in the captured image and a feature value stored in the face feature value DB 123 and calculates the matching rate between the feature values. The matching rate between the feature values is a so-called matching score. For example, after the authentication section 112 calculates the matching rate between the feature values for each feature point, the authentication section 112 calculates the matching rate of the one captured image on the basis of the calculated matching rate for each of the feature points. The authentication section 112 authenticates the person P as a user of the vehicle 1 on the basis of the matching rate. Specifically, when the matching rate is higher than or equal to a determination threshold set in advance, the authentication section 112 determines that an image captured by the camera 42 includes a candidate for a face image of a user. When the authentication section 112 determines that the image captured by the camera 42 includes a candidate for a face image of a user, the authentication by the authentication section 112 is established. Authentication performed by using a captured image that is one still image and authentication performed by using the image of one frame obtained from a moving image mean that authentication is performed once. When the face feature value DB 123 stores feature values of a plurality of users, the authentication section 112 selects a feature value of one person from the feature values stored in the face feature value DB 123 and repeatedly executes, by the number of registered users, processing of making a determination by calculating the matching rate with a feature value detected in a captured image.

The authentication section 112 executes authentication a plurality of times. That is, the authentication section 112 obtains the images of a plurality of frames from a moving image that is an image captured by the camera 42 and performs the authentication described above for each of the frames, or obtains a plurality of still images that is images captured by the camera 42 and performs the authentication described above for each of the still images. When authentication is established a number of times designated in advance (referred to as an authentication criterion number of times below) or more in a row or when authentication is established that uses a plurality of consecutive frames or authentication is established that uses a plurality of images consecutively captured, the authentication section 112 decides authentication completion. The authentication completion of the authentication section 112 refers to fixing a result of the authentication indicating that the person P is a user of the vehicle 1. In other words, authentication performed once by the authentication section 112 with one frame or one captured image can be considered tentative authentication and the authentication section 112 finally decides the completion of authentication as to a user of the vehicle 1 on the condition that the tentative authentication is established an authentication criterion number of times. Deciding authentication completion by the authentication section 112 means that a result of the authentication indicating that the person P is a user of the vehicle 1 is fixed. This equivalently means that the person P is a user of the vehicle 1 and the person P is about to get in the vehicle 1.

The authentication section 112 may use authentication established an authentication criterion number of times or more with an image captured by the one camera 42 as a condition for determining authentication completion. For example, when the authentication section 112 obtains a plurality of frames corresponding to the authentication criterion number of times from a moving image captured by the camera 42a and the tentative authentication described above is established by using the plurality of obtained frames, the authentication section 112 decides authentication completion. In addition, for example, when the authentication section 112 obtains a plurality of captured images corresponding to the authentication criterion number of times from still images captured by the camera 42a and the tentative authentication described above is established by using the plurality of obtained captured images, the authentication section 112 decides authentication completion.

Authentication performed once by the authentication section 112, that is, tentative authentication is not limited to an example in which only one captured image that is a still image or the image of one frame is used. Authentication performed by the authentication section 112 with a predetermined number of captured images more than or equal to two captured images may be treated as authentication performed once. In this case, the authentication section 112 compares feature values, calculates the matching score by using, for example, one captured image, and makes determinations, adds up results of determinations as to the matching scores for a predetermined number of frames, and determines that tentative authentication is established when a large number of captured images have matching scores higher than or equal to the determination threshold.

In addition, for example, the authentication section 112 may add up feature values detected in the face regions of a predetermined number of captured images, obtain the average or another statistic, compare the obtained statistic with a feature value of the face feature value DB 123, and calculate the matching score.

Needless to say, it is possible for the authentication section 112 to perform authentication once in another method by using a plurality of captured images.

After the authentication section 112 determines that the traveling direction of the person P is a direction toward the vehicle 1, the authentication section 112 may stand by until the person P enters the authentication range 52, and start authentication after the person P enters the authentication range 52. That is, the authentication range 52 that is a range having the radius R2 may be set as a condition for executing the authentication processing.

After the authentication section 112 determines that the traveling direction of the person P is a direction toward the vehicle 1, the authentication section 112 may quickly start authentication. For example, authentication may be started even when the person P is outside the authentication range 52. When the person P is inside the authentication range 52, the person P appears clear in a captured image and it is thus possible to extract a face region and calculate a feature value with high precision, but when the person P is outside the authentication range 52, the precision of the authentication processing decreases. In this way, when the person P is outside the authentication range 52, it is difficult to establish authentication, and authentication with high precision is thus performed substantially after the person P enters the authentication range 52. This causes the authentication range 52 to function as a range within which the authentication processing is effectively performed even if the authentication section 112 does not determine whether the person P is inside or outside the authentication range 52.

When authentication by the authentication section 112 is established, the door operation control section 113 brings any one or more of the door operation units 31, 32, 33, 34, and 35 into operation to release the door lock. After releasing the door locks, the door operation control section 113 may cause the one or more of the door operation units 31, 32, 33, 34, and 35 to execute opening operations. The door operation control section 113 selects any of the door operation units 31, 32, 33, 34, and 35, and brings the selected door operation unit into operation. The door operation control section 113 selects any of the door operation units 31, 32, 33, 34, and 35, for example, on the basis of a result of authentication by the authentication section 112, the movement direction of the person P determined by the authentication section 112, the sensing range 51 through which the person P detected by the approach detection section 111 passes, and the like.

The function control section 116 monitors whether or not a condition for stopping the sensing apparatus 41 is satisfied, and stops a function for the sensing apparatus 41 when the condition is satisfied. Processing of stopping the function for the sensing apparatus 41 by the function control section 116 includes at least any of processing of stopping the sensing apparatus 41 and processing of stopping the supply of electric power to the sensing apparatus 41. In addition, in this processing, the function control section 116 may stop processing of the approach detection section 111 related to the use of the sensing apparatus 41.

The sensing apparatus 41 comes into operation with the vehicle 1 parked. Parked refers to a state in which the speed of the vehicle 1 is speed close to 0 or equal to 0 and a driving source of the vehicle 1 is stopped. For example, when the driving source of the vehicle 1 is an engine, the engine is stopped while the vehicle 1 is parked. In addition, for example, when the driving source of the vehicle 1 is a driving motor, the supply of electric power to an inverter circuit or the like that supplies the driving motor with electric power is stopped while the vehicle 1 is parked. Parking the vehicle 1 includes a state in which a function of the vehicle 1 is stopped and specifically includes a state in which the ignition switch of the vehicle 1 is off. In addition, the vehicle 1 may bring the sensing apparatus 41 into operation with the vehicle 1 parked and nobody in the vehicle 1. While the sensing apparatus 41 is in operation, the approach detection section 111 obtains a result of sensing by the sensing apparatus 41 in a predetermined cycle and detects the person P within the sensing range 51 on the basis of the obtained result of sensing.

The sensing apparatus 41 may come into operation with the vehicle 1 stopped. Stopped refers to a state in which the speed of the vehicle 1 is speed close to 0 or equal to 0 and the driving source of the vehicle 1 is in operation. For example, when the driving source of the vehicle 1 is an engine, the engine is in operation while the vehicle 1 is stopped. In addition, for example, when the driving source of the vehicle 1 is a driving motor, an inverter circuit or the like that supplies the driving motor with electric power is energized and the driving motor is operable while the vehicle 1 is stopped.

In this way, a state in which the sensing apparatus 41 is in operation with the vehicle 1 parked or stopped is referred to as a normal standby state. The normal standby state is a state in which the vehicle 1 stands by for a user to get in the vehicle 1 from the outside of the vehicle 1.

In the normal standby state, the sensing apparatus 41 senses the person P whenever the person P is inside the sensing range 51, and the approach detection section 111 and the authentication section 112 thus each execute processing. These kinds of processing executed whenever the person P who is not a user of the vehicle 1 enters the sensing range 51 lead to an increase in the amount of electric power to be consumed. The vehicle control apparatus 100 thus stops a function of sensing the person P within the sensing range 51 by using the sensing apparatus 41 under a specific condition. This function corresponds to the function for the sensing apparatus 41.

When the function control section 116 stops the function for the sensing apparatus 41, an operation of the sensing apparatus 41 to attempt to sense the person P within the sensing range 51 at a predetermined sampling frequency and an operation of the approach detection section 111 to obtain a result of the sensing by the sensing apparatus 41 are not executed. This makes it possible to suppress the amount of electric power to be consumed for the parked or stopped vehicle 1. For example, when a large number of persons P who are not users of the vehicle 1 pass by the area close to the vehicle 1, the sensing apparatus 41 senses the persons P with high frequency. In such a case, when the function control section 116 stops the function for the sensing apparatus 41, it is possible to effectively reduce the amount of electric power to be consumed for the parked vehicle 1.

Examples of the condition for the function control section 116 to stop the function for the sensing apparatus 41 include the following conditions (1) to (5).

The condition (1) is that time for which a state in which authentication is not established continues from the start of authentication by the authentication section 112 reaches first threshold time or more. After the camera 42 is started and starts to output a captured image, the authentication section 112 obtains the captured image and executes authentication. The function control section 116 monitors time elapsed after the authentication section 112 starts to obtain a captured image or starts processing related to a captured image. The first threshold time is set in the function control section 116 as a threshold for determining the elapsed time. The first threshold time is information for designating the length of the time. When the state in which authentication by the authentication section 112 is not established continues in spite of the above-described elapsed time reaching the first threshold time or more, the function control section 116 determines that the condition (1) is satisfied.

The condition (2) is that the number of times the approach detection section 111 detects the person P within second threshold time reaches an upper limit number of times or more. The second threshold time indicates the length of time for counting the number of times the approach detection section 111 detects the person P. The second threshold time and the upper limit number of times that is an upper limit on the number of detections within the second threshold time are set in the function control section 116. The function control section 116 counts the number of times the approach detection section 111 detects the person P and determines that the condition (2) is satisfied when the number of times the approach detection section 111 detects the person P within the second threshold time reaches the upper limit number of times or more. Here, the upper limit number of times may be the number of times the approach detection section 111 senses the person P by using the one sensing apparatus 41 or the number of times the approach detection section 111 detects the person P by using all of the sensing apparatuses 41 included in the vehicle 1.

The condition (3) is that the number of persons detected by the approach detection section 111 within third threshold time reaches an upper limit number of persons or more. The third threshold time indicates the length of time for counting the number of persons P detected by the approach detection section 111. The third threshold time and the upper limit number of persons that is an upper limit on the number of persons detected within the third threshold time are set in the function control section 116. The function control section 116 counts the number of persons P detected by the approach detection section 111 and determines that the condition (3) is satisfied when the number of persons P detected by the approach detection section 111 within the third threshold time reaches the upper limit number of persons or more. Here, the upper limit number of persons may be an upper limit on the number of persons P detected by the approach detection section 111 using the one sensing apparatus 41 or an upper limit on the number of persons P detected by the approach detection section 111 using all of the sensing apparatuses 41 included in the vehicle 1.

The condition (4) is that the amount of electric power consumed for at least any of the sensing apparatus 41 and the approach detection section 111 reaches an upper limit value or more. The fourth threshold time and the upper limit value of the amount of consumed electric power are set in the function control section 116. The fourth threshold time indicates the length of time for integrating the amounts of consumed electric power, and the upper limit value is the value of the integrated amounts of consumed electric power. The upper limit value is an upper limit on any of the amount of electric power consumed for the sensing apparatus 41, the amount of electric power consumed for the approach detection section 111, and the amount of consumed electric power obtaining by adding that of the sensing apparatus 41 and that of the approach detection section 111 within the fourth threshold time. The fourth threshold time may include start time for starting to integrate the amounts of consumed electric power and end time for ending the integration.

Here, one operation example will be given. In this example, the fourth threshold time is one day or 24 hours and the upper limit value of the amount of electric power consumed for the sensing apparatus 41 in one day is set in the function control section 116. In this example, the function control section 116 integrates the amounts of electric power consumed for the sensing apparatus 41 and determines that the condition (4) is satisfied when the value obtained by integrating the amounts of electric power consumed for the sensing apparatus 41 within the most recent 24 hours reaches the upper limit value set in advance or more.

The condition (5) is that the amount of electric power consumed for at least any of the sensing apparatus 41 and the approach detection section 111 within fifth threshold time shorter than the fourth threshold time reaches a limit value or more. The fifth threshold time and the limit value of the amount of consumed electric power are set in the function control section 116. The fifth threshold time indicates the length of time for integrating the amounts of consumed electric power. The limit value is a threshold for any of the amount of electric power consumed for the sensing apparatus 41, the amount of electric power consumed for the approach detection section 111, and the amount of consumed electric power obtaining by adding that of the sensing apparatus 41 and that of the approach detection section 111 within the fifth threshold time. For example, when five minutes is set as the fifth threshold time, the function control section 116 determines that the condition (5) is satisfied when the value obtained by integrating the amounts of electric power consumed for the sensing apparatus 41 within the most recent five minutes reaches the limit value set in advance or more. It is possible to combine the condition (5) with the condition (4). That is, the fourth threshold time and the upper limit value, and the fifth threshold time and the limit value are set in the function control section 116. In this case, the function control section 116 stops the function related to the sensing apparatus 41 when any of the condition that the amount of electric power consumed within the fourth threshold time reaches the upper limit value and the condition that the amount of electric power consumed within the fifth threshold time reaches the limit value is satisfied. That is to say, the function control section 116 monitors the amount of electric power consumed per defined time in two steps.

The first threshold time, the second threshold time, the third threshold time, the fourth threshold time, the fifth threshold time, the upper limit number of times, the upper limit number of persons, the upper limit value of the amount of consumed electric power, and the limit value of the amount of consumed electric power described above are included in the setting data 122 and stored in the memory 120.

A state of the vehicle 1 in which the function control section 116 stops the function for the sensing apparatus 41 is referred to as a standby stop state. When the function control section 116 causes the vehicle 1 to transition to the standby stop state, the function control section 116 may issue a notification to the terminal apparatus 2. This notification is issued by the function control section 116 transmitting notification data to the terminal apparatus 2 by the communication apparatus 29. In this case, the communication apparatus 29 may transmit notification data to the terminal apparatus 2 through near-field communication or may transmit notification data through cellular communication.

The notification data transmitted from the vehicle 1 to the terminal apparatus 2 includes a notification having contents indicating that the function for the sensing apparatus 41 is stopped. For example, when the terminal apparatus 2 receives the notification data and displays the contents of the received notification data on a display screen, a user of the vehicle 1 is informed that the vehicle 1 transitions to the standby stop state.

The notification data transmitted from the vehicle 1 to the terminal apparatus 2 may include contents that exhibit an instruction to return the vehicle 1 from the standby stop state to the normal standby state. For example, the notification data may include a user interface that receives an instruction to return the vehicle 1 to the normal standby state. This user interface is displayed, for example, on a display screen included in the terminal apparatus 2 and includes an icon or a button that receives an instruction to return the vehicle 1 to the normal standby state through an operation on a touch panel of the terminal apparatus 2 or another input device. This user interface may have a form that makes it possible to perform an operation of designating a timing at which the vehicle 1 transitions to the normal standby state.

The terminal apparatus 2 transmits, to the vehicle 1, control data including an instruction to return the vehicle 1 to the normal standby state in accordance with an operation of a user corresponding to the notification data. When the communication apparatus 29 receives this control data, the function control section 116 starts the function related to the sensing apparatus 41 and causes the vehicle 1 to transition to the normal standby state. In addition, when an operation is performed of designating a timing at which the vehicle 1 transitions to the normal standby state, the terminal apparatus 2 transmits, to the vehicle 1, control data that includes information indicating the designated timing. This information is information for designating, for example, time necessary before causing the vehicle 1 to transition to the normal standby state, or a date and time for causing the vehicle 1 to transition to the normal standby state. In this case, the function control section 116 returns the vehicle 1 to the normal standby state at the timing designated by the control data.

The function control section 116 returns the vehicle 1 from the standby stop state to the normal standby state not only upon receiving the control data from the terminal apparatus 2, but also in response to another operation by a user.

For example, when the function control section 116 detects an operation of a user on the vehicle 1, the function control section 116 returns the vehicle 1 to the normal standby state. The operation on the vehicle 1 is, for example, an operation on any of the door handle sensors 11b, 12b, 13b, 14b, and 15b. Specifically, the operation on the vehicle 1 is a touch operation or a pushing operation.

In addition, when it is possible to communicate with the terminal apparatus 2 by the communication apparatus 29, the function control section 116 returns the vehicle 1 to the normal standby state. In this case, it is preferable that communication executed by the communication apparatus 29 be near-field communication. That is, when it is possible for the communication apparatus 29 to communicate with the terminal apparatus 2 through near-field communication, the function control section 116 returns the vehicle 1 to the normal standby state. When it is possible to communicate with the terminal apparatus 2 through near-field communication, a user holding the terminal apparatus 2 is near the vehicle 1. It is thus appropriate to return the vehicle 1 to the normal standby state.

The function control section 116 may be capable of executing the function of stopping the camera 42. For example, when time for which the person P is not detected by the approach detection section 111 is longer than or equal to time set in advance, the function control section 116 stops the camera 42. In addition, when authentication by the authentication section 112 is established and the door operation control section 113 brings any of the door operation units 31, 32, 33, 34, and 35 into operation, the function control section 116 may stop the camera 42. Control to stop the camera 42 may include processing of stopping the supply of electric power to the camera 42 or processing of stopping the function of the authentication section 112. In addition, the authentication section 112 may execute the control to stop the camera 42.

Control to start the camera 42 may be executed by the authentication section 112 or executed by the function control section 116. In the present embodiment, the authentication section 112 starts the camera 42 when the approach detection section 111 detects the person P. After the camera 42 is started, the authentication section 112 performs the authentication described above by using an image captured by the camera 42.

FIG. 3 illustrates a variety of ECUs included in the vehicle 1 and some of the components of the vehicle 1. Needless to say, the vehicle 1 can include a component that is not illustrated in FIG. 3. In addition, the vehicle 1 does not have to include all of the components illustrated in FIG. 3. For example, the vehicle 1 does not have to include the door handle sensors 11b, 12b, 13b, 14b, and 15b.

3. Operation of Vehicle Control Apparatus

Figure 4:
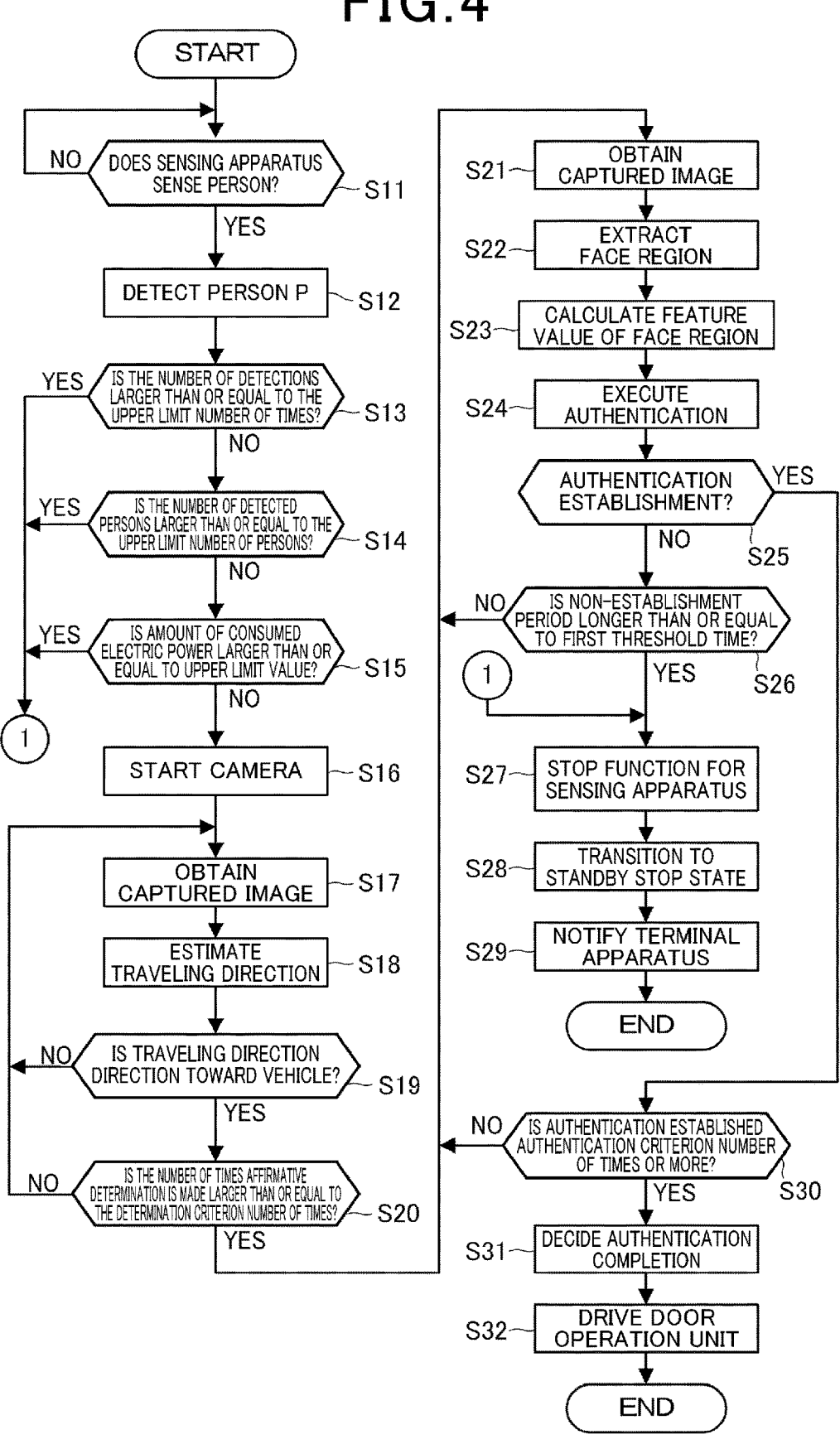
FIG. 4 is a flowchart illustrating an operation of a vehicle control apparatus.
Figure 5:
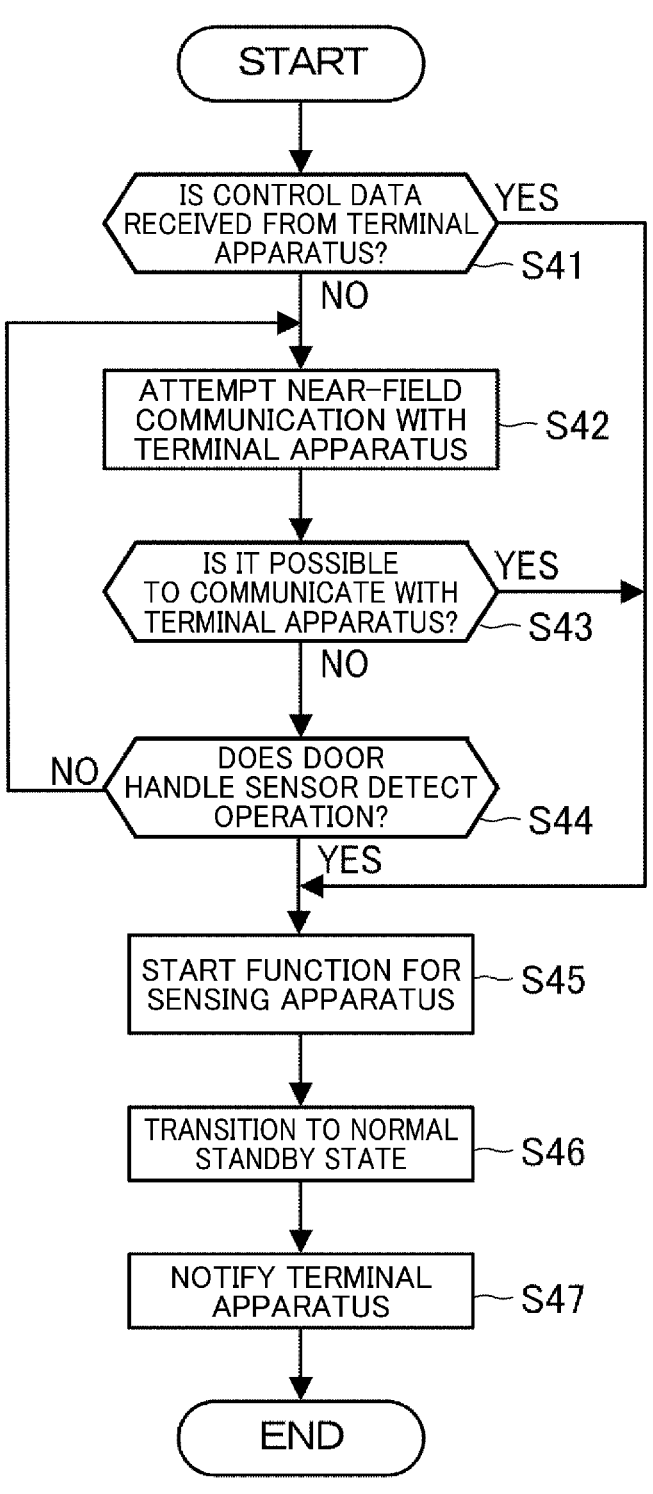
FIG. 5 is a flowchart illustrating an operation of the vehicle control apparatus.

Each of FIGS. 4 and 5 is a flowchart illustrating an operation of the vehicle control apparatus 100.

In FIG. 4, the approach detection section 111 executes steps S11 to S12, the authentication section 112 executes steps S16 to S25 and S30 to S31, the door operation control section 113 executes step S32, and the function control section 116 executes steps S13 to S15 and S26 to S28.

The vehicle control apparatus 100 determines whether or not the sensing apparatus 41 senses the person P by obtaining a result of sensing by the sensing apparatus 41 (step S11). When the sensing apparatus 41 does not sense the person P (step S11; NO), the vehicle control apparatus 100 repeatedly executes step S11 in a predetermined time cycle. When the sensing apparatus 41 senses the person P (step S11; YES), the vehicle control apparatus 100 detects the presence of the person P within the sensing range 51 (step S12).

The vehicle control apparatus 100 determines whether or not the number of times the approach detection section 111 detects the person P within the second threshold time is larger than or equal to the upper limit number of times (step S13). That is, the vehicle control apparatus 100 determines whether or not the condition (2) described above is satisfied in step S13.

When the number of times the approach detection section 111 detects the person P is not larger than or equal to the upper limit number of times (step S13; NO), the vehicle control apparatus 100 determines whether or not the number of persons P detected by the approach detection section 111 within the third threshold time is larger than or equal to the upper limit number of persons (step S14). That is, the vehicle control apparatus 100 determines whether or not the condition (3) described above is satisfied in step S14.

When the number of persons P detected by the approach detection section 111 is not larger than or equal to the upper limit number of persons (step S14; NO), the vehicle control apparatus 100 determines whether or not the amount of electric power consumed within the fifth threshold time is larger than or equal to the upper limit value (step S15). That is, the vehicle control apparatus 100 determines whether or not the condition (4) described above is satisfied in step S15. In step S15, the vehicle control apparatus 100 may determine whether or not the condition (5) is satisfied.

When the number of times the approach detection section 111 detects the person P is larger than or equal to the upper limit number of times (step S13; YES) and the number of persons P detected by the approach detection section 111 is larger than or equal to the upper limit number of persons (step S14; YES), the vehicle control apparatus 100 transitions to step S27 described below. In addition, when the amount of consumed electric power is larger than or equal to the upper limit value (step S15; YES), the vehicle control apparatus 100 transitions to step S27.

When the amount of consumed electric power is not larger than or equal to the upper limit value (step S15; NO), the vehicle control apparatus 100 starts the camera 42 (step S16). After the camera 42 is started, the vehicle control apparatus 100 obtains an image captured by the camera 42 (step S17) and estimates the movement direction of the person P on the basis of the obtained captured image (step S18). The vehicle control apparatus 100 determines whether or not the estimated traveling direction is a direction toward the vehicle 1 (step S19). When the vehicle control apparatus 100 determines that the estimated traveling direction is not a direction toward the vehicle 1 (step S19; NO), the vehicle control apparatus 100 returns to step S17.

When the vehicle control apparatus 100 determines that the estimated traveling direction is a direction toward the vehicle 1 (step S19; YES), the vehicle control apparatus 100 determines whether or not the number of times an affirmative determination is made in step S19 is larger than or equal to a determination criterion number of times (step S20). When the vehicle control apparatus 100 determines that the number of times an affirmative determination is made in step S19 or the number of times it is determined that the traveling direction of the person P is a direction toward the vehicle 1 is larger than or equal to the determination criterion number of times (step S19; YES), the vehicle control apparatus 100 transitions to step S21. In addition, when the vehicle control apparatus 100 determines that the number of times an affirmative determination is made in step S19 is smaller than the determination criterion number of times (step S19; NO), the vehicle control apparatus 100 returns to step S17.

The vehicle control apparatus 100 authenticates the person P in steps S21 to S24. Steps S21 to S24 correspond to tentative authentication performed once. The vehicle control apparatus 100 obtains an image captured by the camera 42 in step S21 (step S21). In step S21, the vehicle control apparatus 100 obtains one still image or one captured image including one frame as described above. The vehicle control apparatus 100 extracts a face region from the obtained captured image (step S22). The vehicle control apparatus 100 calculates a feature value of the face region (step S23) and performs authentication on the basis of the calculated feature value (step S24). In step S24, for example, as described above, the matching score is calculated between the feature value calculated from the face region and a feature value stored in the face feature value DB 123 and the calculated matching score is compared with the determination threshold.

The vehicle control apparatus 100 determines whether or not the authentication is established (step S25). For example, when the matching score is higher than or equal to the determination threshold, the vehicle control apparatus 100 determines that the authentication is established. When the authentication is not established (step S25; NO), the vehicle control apparatus 100 transitions to step S26.

In step S26, the vehicle control apparatus 100 determines whether or not the time for which authentication is not established is longer than or equal to the first threshold time (step S26). The time for which authentication is not established in step S26 is time for which tentative authentication in steps S21 to S24 is not established even once by using the time point at which step S21 is started as a starting point. When tentative authentication is established even once, the count of this time is reset. The determination in step S26 corresponds to a determination as to whether or not the condition (1) is satisfied.

When the vehicle control apparatus 100 determines that the time for which authentication is not established is not longer than or equal to the first threshold time (step S26; NO), the vehicle control apparatus 100 returns to step S21. When the vehicle control apparatus 100 determines that the time for which authentication is not established is longer than or equal to the first threshold time (step S26; YES), the vehicle control apparatus 100 transitions to step S27.

In step S27, the vehicle control apparatus 100 stops the function for the sensing apparatus 41 (step S27). As described above, the vehicle control apparatus 100 may stop the supply of electric power to the sensing apparatus 41 in step S27. Subsequently, the vehicle control apparatus 100 causes the vehicle 1 to transition to the standby stop state (step S28) and notifies the terminal apparatus 2 of the transition to the standby stop state by using the communication apparatus 29 (step S29). After the vehicle control apparatus 100 causes the vehicle 1 to transition to the standby stop state, the vehicle control apparatus 100 ends this processing and executes an operation in FIG. 5.

In contrast, when the authentication is established (step S25; YES), the vehicle control apparatus 100 determines whether or not authentication is established an authentication criterion number of times or more (step S30). In step S30, the vehicle control apparatus 100 may determine whether or not authentication is established an authentication criterion number of times or more in a row. When authentication is not established an authentication criterion number of times or more (step S30; NO), the vehicle control apparatus 100 returns to step S21. When the authentication is established an authentication criterion number of times or more (step S30; YES), it is decided that the authentication is completed or authentication completion is decided (step S31). After the vehicle control apparatus 100 decides authentication completion, the vehicle control apparatus 100 brings any one or more of the door operation units 31, 32, 33, 34, and 35 into operation (step S32). In step S32, the vehicle control apparatus 100 selects an openable and closeable object to be brought into operation from the front doors 11 and 12, the rear doors 13 and 14, and the rear gate 15. The vehicle control apparatus 100 brings the door operation unit into operation that is provided to the openable and closeable object selected from the door operation units 31, 32, 33, 34, and 35. This releases the door lock of any of the openable and closeable objects of the vehicle 1 or causes an opening operation to be executed on any of the openable and closeable objects of the vehicle 1. After that, the vehicle control apparatus 100 ends this processing, and returns to step S11 and continues standing by, for example, when the vehicle 1 is parked.

Among the operations of FIG. 5, the function control section 116 executes steps S41 to S47.

The vehicle control apparatus 100 determines whether or not control data for instructing the vehicle 1 to return to the normal standby state is received from the terminal apparatus 2 in the standby stop state (step S41). When the control data is received (step S41; YES), the vehicle control apparatus 100 transitions to step S45 described below.

When the control data is not received (step S41; NO), the vehicle control apparatus 100 causes the communication apparatus 29 to attempt near-field communication with the terminal apparatus 2 (step S42). The vehicle control apparatus 100 determines whether or not it is possible for the communication apparatus 29 to communicate with the terminal apparatus 2 (step S43). When it is possible for the communication apparatus 29 to communicate with the terminal apparatus 2 through near-field communication (step S43; YES), the vehicle control apparatus 100 transitions to step S45.

When it is not possible for the communication apparatus 29 to communicate with the terminal apparatus 2 through near-field communication (step S43; NO), the vehicle control apparatus 100 determines whether or not any of the door handle sensors 11b, 12b, 13b, 14b, and 15b detects an operation (step S44). When any operation is detected (step S44; YES), the vehicle control apparatus 100 transitions to step S45. In addition, when no operation is detected (step S44; NO), the vehicle control apparatus 100 returns to step S42.

In step S45, the vehicle control apparatus 100 starts the function for the sensing apparatus 41 (step S45). In step S45, the vehicle control apparatus 100 performs, for example, processing of starting the supply of electric power to the sensing apparatus 41, processing of starting and initializing the sensing apparatus 41, and processing of starting the function of the approach detection section 111. The vehicle control apparatus 100 causes the vehicle 1 to transition to the normal standby state (step S46) and notifies the terminal apparatus 2 of the transition to the normal standby state by using the communication apparatus 29 (step S47). After the vehicle control apparatus 100 causes the vehicle 1 to transition to the normal standby state, the vehicle control apparatus 100 ends this processing and executes an operation in FIG. 4.

4. Other Embodiments

In the embodiment described above, the sensing range 51 and the authentication range 52 are illustrated as fan-shaped ranges that have overlapping centers, but this is an example. The shapes and sizes of the sensing range 51 and the authentication range 52 are not limited to the example illustrated in FIG. 1. In addition, the authentication range 52 is not limited to the inside of the sensing range 51. In addition, in the embodiment described above, the configuration has been exemplified in which the vehicle 1 includes the three detection units 40a, 40b, and 40c corresponding to the areas in the rear direction and the lateral direction of the vehicle 1, but this is an example. A larger number of detection units may be provided to the vehicle 1. For example, the vehicle 1 may be provided with a detection unit that has the sensing range 51 and the authentication range 52 including the area in the front direction of the vehicle 1. This detection unit may be, for example, a camera or a sensor used for the advanced driver-assistance systems (ADAS) of the vehicle 1, or a camera or a sensor used for a security apparatus of the vehicle 1. In addition, the example has been described in which each of the detection units 40a and 40b is buried and installed in the outer surface of the center pillar of the vehicle 1 between the front door 11 and the rear door 13, but this is an example. For example, one or both of the detection unit 40a and the detection unit 40b may be installed on the roof of the vehicle 1. In addition, for example, one or both of the detection unit 40a and the detection unit 40b may be buried and installed at positions overlapping with the pillar or positions overlapping with the area near the pillar on the outer surfaces of the front door 11 and the rear door 13.

The authentication processing described in the embodiment above is an example. For example, the authentication section 112 may perform authentication processing by using images captured by the plurality of cameras 42 among the cameras 42a, 42b, and 42c included in the vehicle 1. Needless to say, it is possible to adopt authentication processing compliant with another method.

FIG. 3 is a schematic diagram in which the configuration of the vehicle control apparatus 100 is divided in accordance with the chief processing contents to facilitate the understandings of the invention according to the present application, but the vehicle control apparatus 100 may be configured in accordance with other division. In addition, the processing of each of the components may be executed by one hardware unit or executed by a plurality of hardware units. The processing illustrated in each of FIGS. 4 and 5 may be executed by one program or executed by a plurality of programs. In addition, the vehicle control apparatus 100 may include one ECU or functions of the vehicle control apparatus 100 may be executed by a plurality of ECUs.

The processing units of the flowchart illustrated in each of FIGS. 4 and 5 result from division compliant with the chief processing contents to facilitate the understandings of the processing by the vehicle control apparatus 100, but the present invention is not limited by the way of the division or the name of the processing units. It is also possible to further divide this processing into more processing units in accordance with the processing contents or further divide this processing to cause one processing unit to include more processing. In addition, the processing order of any of the flowcharts described above is not also limited to the illustrated example.

In the embodiment described above, the vehicle control apparatus according to the present invention is configured by the execution of the control program 121 by the processor 110 of the vehicle control apparatus 100 included in the vehicle 1 and the processor 110 executes the vehicle control method. As another embodiment, the vehicle control apparatus may be configured on a server that communicates with the vehicle 1 by the execution of a vehicle control program by a computer included in the server and the computer may execute the vehicle control method. In this case, a user who approaches the vehicle 1 is authenticated on the basis of a captured image of the area around the vehicle 1 that is transmitted from the vehicle 1 to the server and the user is permitted entry to the vehicle 1.

The control program 121 that is executed by the processor 110 according to the present embodiment is not only configured to be stored in the memory 120, but is also implementable as stored in a non-transitory computer-readable storage medium. As the non-transitory computer-readable storage medium, for example, a magnetic storage apparatus, a magnetic recording medium, an optical recording medium, or a semiconductor memory device is usable. Specifically, portable or stationary recording media such as a flexible disk, a hard disk drive (HDD), a CD-ROM, a DVD, a magneto-optical disk, a flash memory, and a card-shaped recording medium are included. The non-transitory computer-readable storage medium may be a non-volatile storage apparatus such as a RAM, a ROM, or an HDD that is an internal storage apparatus included in a computer including the vehicle control apparatus 100.

5. Configurations Supported by Embodiments Above

The embodiments described above are specific examples of the following configurations.

(Configuration 1) A vehicle control apparatus including: an approach detection section configured to detect a person around a vehicle by a sensing apparatus mounted on the vehicle; an authentication section configured to authenticate, when the approach detection section detects a person, the person detected by the approach detection section as a user of the vehicle by using an image captured by an image capturing unit mounted on the vehicle; and a function control section configured to stop a function for the sensing apparatus when time for which a state in which authentication is not established continues after the authentication section starts the authentication reaches first threshold time or more.

The vehicle control apparatus according to Configuration 1 stops a function for a sensing apparatus when a state in which authentication is not established as to a person sensed around a vehicle continues. This suppresses electric power to be consumed due to the detection of a person who does not correspond to a user of the vehicle. It is thus possible to perform an operation of reducing the electric power consumption of a smart entry function of the vehicle at an appropriate timing and eventually contribute to an increase in the efficiency of energy.

(Configuration 2) The vehicle control apparatus according to Configuration 1, in which processing of stopping the function for the sensing apparatus by the function control section includes at least any of processing of stopping the sensing apparatus and processing of stopping supply of electric power to the sensing apparatus.

The vehicle control apparatus according to Configuration 2 makes it possible to effectively suppress the amount of electric power to be consumed for a sensing apparatus.

(Configuration 3) The vehicle control apparatus according to Configuration 1 or 2, in which, when a number of times the approach detection section detects a person within second threshold time reaches an upper limit number of times or more, the function control section stops the function for the sensing apparatus.

The vehicle control apparatus according to Configuration 3 stops a function for a sensing apparatus when the sensing apparatus frequently comes into operation due to the presence of a person who does not correspond to a user of a vehicle. It is thus possible to perform an operation of reducing the electric power consumption of a smart entry function of the vehicle at an appropriate timing.

(Configuration 4) The vehicle control apparatus according to any one of Configurations 1 to 3, in which, when a number of persons sensed by the approach detection section within third threshold time reaches an upper limit number of persons or more, the function control section stops the function for the sensing apparatus.

The vehicle control apparatus according to Configuration 4 stops a function for a sensing apparatus when the sensing apparatus frequently comes into operation due to the presence of a person who does not correspond to a user of a vehicle. It is thus possible to perform an operation of reducing the electric power consumption of a smart entry function of the vehicle at an appropriate timing.

(Configuration 5) The vehicle control apparatus according to any one of Configurations 1 to 4, in which the function control section has an upper limit value for an amount of electric power consumed for at least any of the sensing apparatus and the approach detection section within fourth threshold time, and when the amount of electric power consumed for at least any of the sensing apparatus and the approach detection section reaches the upper limit value or more, the function control section stops the function for the sensing apparatus.

The vehicle control apparatus according to Configuration 5 stops a function for a sensing apparatus by using, as a trigger, the amount of electric power consumed for an operation of the sensing apparatus reaching an upper limit value, which makes it possible to more reliably suppress the amount of electric power to be consumed.

(Configuration 6) The vehicle control apparatus according to any one of Configurations 1 to 5, in which, when the function control section detects an operation on an openable and closeable object included in the vehicle in a state in which the function for the sensing apparatus is stopped, the function control section causes the approach detection section to transition to a state in which the function for the sensing apparatus is executable.

The vehicle control apparatus according to Configuration 6 makes it possible to return to a state in which a function for a sensing apparatus is executable from a state in which the function for the sensing apparatus is stopped by a user performing an operation on an openable and closeable object of a vehicle. This makes it possible to save electric power without decreasing the convenience of the user.

(Configuration 7) The vehicle control apparatus according to any one of Configurations 1 to 6, in which the function control section is capable of controlling a communication apparatus that communicates with a terminal apparatus, and determines whether or not the communication apparatus is capable of communicating with the terminal apparatus after the function for the sensing apparatus is stopped, and causes the approach detection section to transition to a state in which the function for the sensing apparatus is executable when determining that the communication apparatus is capable of communicating with the terminal apparatus.

The vehicle control apparatus according to Configuration 7 makes a return to a state in which a function for a sensing apparatus is executable when it is possible to communicate with a terminal apparatus in a state in which the function for the sensing apparatus is stopped. This allows a user to use a function for smart entry as long as it is possible to communicate with the terminal apparatus. This makes it possible to save electric power without decreasing the convenience of the user.

(Configuration 8) The vehicle control apparatus according to any one of Configurations 1 to 7, in which the function control section is capable of controlling a communication apparatus that communicates with a terminal apparatus, causes the communication apparatus to issue a notification to the terminal apparatus after the function for the sensing apparatus is stopped, and causes, when the communication apparatus receives control data transmitted from the terminal apparatus in response to the notification, the approach detection section to transition to a state in which the function for the sensing apparatus is executable in accordance with the control data.

The vehicle control apparatus according to Configuration 8 makes a return to a state in which a function for a sensing apparatus is executable by a terminal apparatus transmitting control data in a state in which the function for the sensing apparatus is stopped. This allows a user to use the function for the smart entry by causing the terminal apparatus to transmit the control data. In addition, it is possible to inform the user that the function for the sensing apparatus is stopped. It is thus possible to save electric power for the function for the sensing apparatus without decreasing the convenience of the user.

(Configuration 9) A vehicle control method that is executed by a computer, the vehicle control method including: detecting a person around a vehicle by a sensing apparatus mounted on the vehicle; authenticating, when a person around the vehicle is detected, the detected person as a user of the vehicle by using an image captured by an image capturing unit mounted on the vehicle; and stopping a function for the sensing apparatus when time for which a state in which authentication is not established continues after the authentication is started reaches first threshold time or more.

The vehicle control method according to Configuration 9 stops a function for a sensing apparatus when a state in which authentication is not established as to a person sensed around a vehicle continues. This suppresses electric power to be consumed due to the detection of a person who does not correspond to a user of the vehicle. It is thus possible to perform an operation of reducing the electric power consumption of a smart entry function of the vehicle at an appropriate timing and eventually contribute to an increase in the efficiency of energy.

(Configuration 10) A non-transitory computer-readable storage medium storing a program that is executable by a computer, the program causing the computer to function as: an approach detection section configured to detect a person around a vehicle by a sensing apparatus mounted on the vehicle; an authentication section configured to authenticate, when the approach detection section detects a person, the person detected by the approach detection section as a user of the vehicle by using an image captured by an image capturing unit mounted on the vehicle; and a function control section configured to stop a function for the sensing apparatus when time for which a state in which authentication is not established continues after the authentication section starts the authentication reaches first threshold time or more.

The program according to Configuration 10 stops a function for a sensing apparatus when a state in which authentication is not established as to a person sensed around a vehicle continues. This suppresses electric power to be consumed due to the detection of a person who does not correspond to a user of the vehicle. It is thus possible to perform an operation of reducing the electric power consumption of a smart entry function of the vehicle at an appropriate timing and eventually contribute to an increase in the efficiency of energy.

REFERENCE SIGNS LIST 1 vehicle
2 terminal apparatus
11, 12 front door (openable and closeable object)
11a, 12a, 13a, 14a, 15a door handle
11b, 12b, 13b, 14b, 15b door handle sensor
13, 14 rear door (openable and closeable object)
15 rear gate (openable and closeable object)
29 communication apparatus
31, 32, 33, 34, 35 door operation unit
31a door lock apparatus
31b opening and closing apparatus
40a, 40b, 40c detection unit
41, 41a, 41b, 41c sensing apparatus
42, 42a, 42b, 42c camera (image shooting unit)
43, 43a, 43b, 43c notification apparatus
51, 51a, 51b, 51c sensing range
52, 52a, 52b, 52c authentication range
100 vehicle control apparatus
110 processor
111 approach detection section
112 authentication section
113 door operation control section
116 function control section
120 memory
121 control program 122 setting data
123 face feature value DB

What is claimed is:

1. A vehicle control apparatus comprising a processor that functions as:
   an approach detection section configured to detect a person around a vehicle by a sensing apparatus mounted on the vehicle;
   an authentication section configured to authenticate, when the approach detection section detects a person, the person detected by the approach detection section as a user of the vehicle by using an image captured by an image capturing unit mounted on the vehicle; and
   a function control section configured to stop a function for the sensing apparatus when time for which a state in which authentication is not established continues after the authentication section starts the authentication reaches first threshold time or more, wherein
   the function control section has an upper limit value for an amount of electric power consumed for at least any of the sensing apparatus and the approach detection section within fourth threshold time, and
   when the amount of electric power consumed for at least any of the sensing apparatus and the approach detection section reaches the upper limit value or more, the function control section stops the function for the sensing apparatus.

2. The vehicle control apparatus according to claim 1, wherein processing of stopping the function for the sensing apparatus by the function control section includes at least any of processing of stopping the sensing apparatus and processing of stopping supply of electric power to the sensing apparatus.

3. The vehicle control apparatus according to claim 1, wherein, when a number of times the approach detection section detects a person within second threshold time reaches an upper limit number of times or more, the function control section stops the function for the sensing apparatus.

4. The vehicle control apparatus according to claim 1, wherein, when a number of persons sensed by the approach detection section within third threshold time reaches an upper limit number of persons or more, the function control section stops the function for the sensing apparatus.

5. The vehicle control apparatus according to claim 1, wherein, when the function control section detects an operation on an openable and closeable object provided on an outer surface of the vehicle in a state in which the function for the sensing apparatus is stopped, the function control section causes the approach detection section to transition to a state in which the function for the sensing apparatus is executable.

6. The vehicle control apparatus according to claim 1, wherein the function control section
   is capable of controlling a communication apparatus that communicates with a terminal apparatus, and
   determines whether or not the communication apparatus is capable of communicating with the terminal apparatus after the function for the sensing apparatus is stopped, and causes the approach detection section to transition to a state in which the function for the sensing apparatus is executable when determining that the communication apparatus is capable of communicating with the terminal apparatus.

7. The vehicle control apparatus according to claim 1, wherein the function control section
   causes a communication apparatus to issue a notification to a terminal apparatus after the function for the sensing apparatus is stopped, the communication apparatus communicating with the terminal apparatus, and causes, when the communication apparatus receives control data transmitted from the terminal apparatus in response to the notification, the approach detection section to transition to a state in which the function for the sensing apparatus is executable in accordance with the control data.

8. A vehicle control method that is executed by a processor, the vehicle control method comprising the steps of:

detecting a person around a vehicle by a sensing apparatus mounted on the vehicle;

authenticating, when a person around the vehicle is detected, the detected person as a user of the vehicle by using an image captured by an image capturing unit mounted on the vehicle; and stopping a function for the sensing apparatus when time for which a state in which authentication is not established continues after the authentication is started reaches first threshold time or more;

wherein there is established an upper limit value for an amount of electric power consumed any of the sensing apparatus and the image capturing unit within fourth threshold time, and when the amount of electric power consumed by any of the sensing apparatus and the image capturing unit reaches the upper limit value or more, the function control section stops the function for the sensing apparatus.

9. A non-transitory computer-readable storage medium storing a program that is executable by a processor, the program causing the processor to function as:

an approach detection section configured to detect a person around a vehicle by a sensing apparatus mounted on the vehicle;

an authentication section configured to authenticate, when the approach detection section detects a person, the person detected by the approach detection section as a user of the vehicle by using an image captured by an image capturing unit mounted on the vehicle; and a function control section configured to stop a function for the sensing apparatus when time for which a state in which authentication is not established continues after the authentication section starts the authentication reaches first threshold time or more;

wherein the function control section has an upper limit value for an amount of electric power consumed for at least any of the sensing apparatus and the approach detection section within fourth threshold time, and when the amount of electric power consumed for at least any of the sensing apparatus and the approach detection section reaches the upper limit value or more, the function control section stops the function for the sensing apparatus.

10. A vehicle control apparatus comprising:

a sensing apparatus configured to sense a person around a vehicle, and a processor that functions as:

an approach detection section configured to detect the person around the vehicle based on a sensing result of the sensing apparatus;

an authentication section configured to authenticate, when the approach detection section detects a person, as to whether or not the person detected by the approach detection section is a person registered as a user of the vehicle; and a function control section configured to stop a function of sensing the person in a predetermined sensing range by using the sensing apparatus, wherein when time for which a state in which authentication is not established continues after the authentication is started reaches first threshold time or more, the function control section stops the function for the sensing apparatus, when a number of times the approach detection section detects a person within second threshold time reaches an upper limit number of times or more by counting detection events based on the sensing result of the sensing apparatus, the function control section stops the function for the sensing apparatus, processing of stopping the function for the sensing apparatus by the function control section includes processing of stopping the function for the sensing apparatus by the function control section includes stopping supply of electric power to the sensing apparatus.

11. A vehicle control apparatus comprising:

a sensing apparatus configured to sense a person around a vehicle, and a processor that functions as:

an approach detection section configured to detect the person around the vehicle based on a sensing result of the sensing apparatus;

an authentication section configured to authenticate, when the approach detection section detects a person, as to whether or not the person detected by the approach detection section is a person registered as a user of the vehicle; and a function control section configured to stop a function of sensing the person in a predetermined sensing range by using the sensing apparatus, wherein when time for which a state in which authentication is not established continues after the authentication is started reaches first threshold time or more, the function control section stops the function for the sensing apparatus, when a number of persons sensed by the approach detection section within third threshold time reaches an upper limit number of persons or more by counting detection events based on the sensing result of the sensing apparatus, the function control section stops the function for the sensing apparatus, processing of stopping the function for the sensing apparatus by the function control section includes processing of stopping the function for the sensing apparatus by the function control section includes stopping supply of electric power to the sensing apparatus.

* * * * *